United States Patent
Ståle et al.

(10) Patent No.: US 8,686,681 B2
(45) Date of Patent: Apr. 1, 2014

(54) POWER SUPPLY APPARATUS FOR ELECTRONIC, ELECTRICAL, AND ELECTROMECHANICAL INSTALLATIONS

(75) Inventors: Hope Ståle, Vestskogen (NO); Lars Gunnar Hodnefjell, Mosterøy (NO); Tor Forsmann, Borgheim (NO)

(73) Assignee: Oceaneering AS (NO)

( * ) Notice: Subject to any disclaimer, the term of this patent is extended or adjusted under 35 U.S.C. 154(b) by 693 days.

(21) Appl. No.: 12/302,680

(22) PCT Filed: May 25, 2007

(86) PCT No.: PCT/NO2007/000181
§ 371 (c)(1),
(2), (4) Date: Jul. 16, 2009

(87) PCT Pub. No.: WO2007/139388
PCT Pub. Date: Dec. 6, 2007

(65) Prior Publication Data
US 2010/0026234 A1    Feb. 4, 2010

(30) Foreign Application Priority Data

May 26, 2006 (NO) .................................. 20062404
May 26, 2006 (NO) .................................. 20062405

(51) Int. Cl.
*H02J 7/00* (2006.01)
*H01M 10/44* (2006.01)
*H01M 10/46* (2006.01)

(52) U.S. Cl.
USPC ......................................... 320/101; 320/167

(58) Field of Classification Search
USPC ............................................... 320/101
See application file for complete search history.

(56) References Cited

U.S. PATENT DOCUMENTS

| | | | |
|---|---|---|---|
| 4,389,870 A | 6/1983 | Boeni et al. | |
| 4,902,960 A * | 2/1990 | Lowenstein et al. | 324/621 |
| 5,519,295 A | 5/1996 | Jatnieks | |
| 6,265,851 B1 * | 7/2001 | Brien et al. | 320/162 |
| 6,386,108 B1 | 5/2002 | Brooks et al. | |
| 6,595,487 B2 | 7/2003 | Johansen et al. | |
| 7,050,291 B2 | 5/2006 | Narendra et al. | |
| 2002/0011580 A1 | 1/2002 | Johansen et al. | |
| 2003/0048697 A1 | 3/2003 | Hirsch et al. | |
| 2005/0134212 A1 * | 6/2005 | Chuang | 320/101 |
| 2005/0179263 A1 | 8/2005 | Johansen et al. | |
| 2005/0211436 A1 | 9/2005 | Fripp et al. | |
| 2006/0098390 A1 * | 5/2006 | Ashtiani et al. | 361/502 |

FOREIGN PATENT DOCUMENTS

NO    312376 B1    4/2002

OTHER PUBLICATIONS

Sigbjorn Sangesland and Michael Golan, "Subsea Electrical Valve Actuator," 8th Underwater Technology Conference International Exchange of Experience and Technology, Bergen, Mar. 14-16, 1994.
European Patent Office, "Communication Pursuant to Article 94(3) EPC" in connection with related European Patent App. No. 07 747 640.6-1610, dated Sep. 25, 2013, 4 pages.

* cited by examiner

*Primary Examiner* — Arun Williams
(74) *Attorney, Agent, or Firm* — Kolisch Hartwell, P.C.

(57) ABSTRACT

An apparatus for power supply to electronic, electrical or electromechanical equipment, the apparatus including a chargeable power source in the form of at least one high energy capacitor package (1); equipment control unit (3) for controlling power supply to the equipment, a power source control unit (2) for controlled charging and discharging of the power source, and a means (4; 10'; 11'; 12') for power supply from an external energy source (10; 11; 12) to the power source control unit (2).

13 Claims, 3 Drawing Sheets

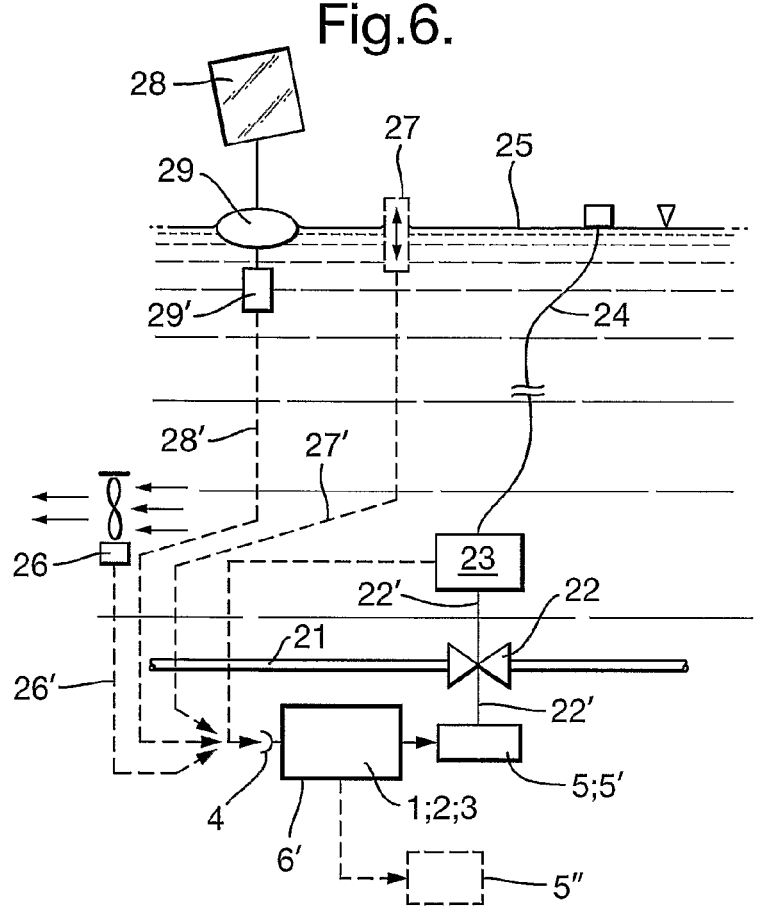
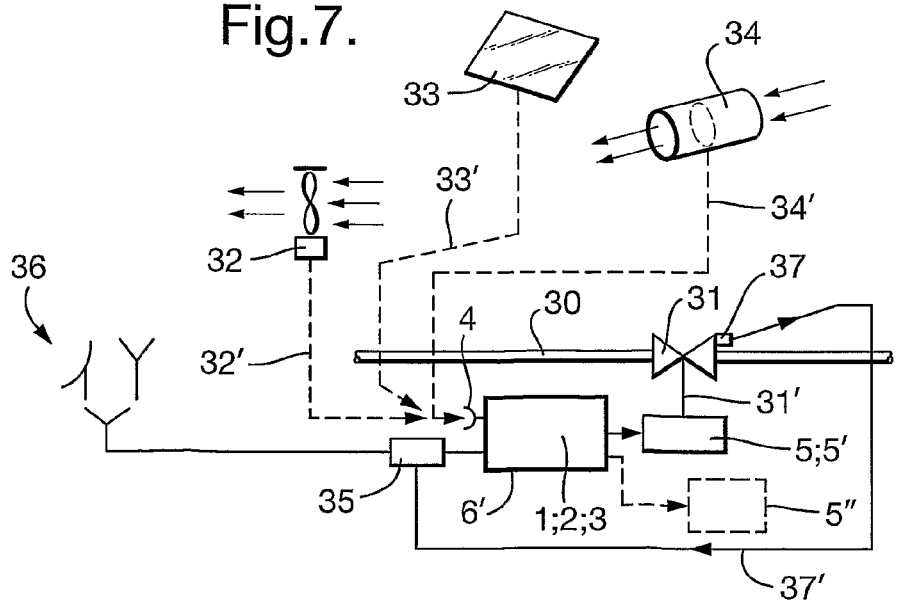

POWER SUPPLY APPARATUS FOR ELECTRONIC, ELECTRICAL, AND ELECTROMECHANICAL INSTALLATIONS

The present invention relates to an apparatus for operating controllable installation means as disclosed in the preamble of attached claim 1.

In this application "installation" should be understood in general as either a subsea installation or a land-based installation. Such installations may be of an electromechanical, electrical or electronic or electro-optical type.

One such known apparatus is, inter alia, described in NO Patent 312376, where for the control of valves in a subsea installation, a motor is used which receives driving power from an external power source or locally from a battery. Another solution is the possibility of storing energy underwater in or proximate to an actuator. Valves of this kind are operated at rare intervals, and this provides the possibility of charging such an energy source over a long time with low current. It is disclosed that the battery and the control unit connected thereto may be a part of a module which is detachably connected to the respective motor, thereby allowing the module to be brought to the surface for maintenance. As an alternative, the motor may also be included in such a module which may easily be brought up to the surface.

As examples of other known technology, reference may be made to U.S. Pat. No. 5,497,672 and Norwegian Patent Application 1994260, and also to the article "Subsea electric valve actuation", Sigbjørn Sangesland et al., Underwater Technology Conference, Bergen, 14-16 Mar. 1994. In the last-mentioned document, various techniques are described in connection with the control and operation of subsea valves. It is proposed, inter alia, to allow the electric motor used to be connected to a battery that can meet peaks in power demands or be used to close the valve in an emergency. Normal power supply takes place from the surface to the installation, with the battery only to be regarded as an emergency or back-up supply.

It is otherwise known that in the operation of electronic or electrical equipment, such as motors, chargeable batteries are often used as a back-up energy source in the event that, for example, the ordinary power supply should fail, especially in sites situated in locations that are hard to reach, such as in subsea installations, on mountain tops, in areas without a permanent road connection, in desolate areas that are not easily accessible by helicopter, in subterranean areas or the like, or in locations that it takes time, and thus involves considerable costs, to reach.

In connection with the operation of installations in a subsea environment or in land-based, impassable regions, it is essential that replacement and maintenance of electronically or electrically powered equipment which operates such installations can be limited to a minimum, in particular because the equipment is hard or awkward to reach.

It has therefore been one of the overall objects of the invention to provide an improved technical solution for power supply to such equipment that is to operate hard-to-reach installations, where the focus has especially been directed towards long operating time without maintenance, the capacity for a great number of discharges and charges without a significant reduction in performance or output, high operating reliability and little sensitivity to temperature as regards performance or output.

In applications where it is costly or difficult to carry out maintenance or replacement of, for example, batteries, unit price however is not critical. Even if the volume of the unit must in some cases be regarded as a disadvantage, the volume aspect in general is not critical. Against a background of extremely difficult accessibility and extremely costly processes in connection with replacement, lifetime and reliability are factors which will have substantially greater importance than price and small physical size.

The present invention is therefore related to providing an apparatus which has good power supply properties combined with the possibilities of monitoring and of rapid and repeated charging without a significant reduction in output or performance.

A major challenge in the use of the conventional, chargeable batteries is that effective battery capacity is affected by particularly low ambient temperature, the number of charges and discharges the battery is subjected to, and that considerable requirements are placed on equipment for efficient charging of the battery. Owing to costly special cables and power transmission connectors, great savings are to be had by reducing the cable cross-section to the minimum when power supply over a considerable distance is required, i.e., as low a current value as possible because this gives thinner and thus less expensive cables. A conventional solution is to use a relatively high voltage, but this has other drawbacks such as a greater risk of short circuiting, the need for large transformers and access to respective voltage.

In addition, the conventional batteries are known for having a limited lifetime, and that, for example, measured voltage is not necessarily an expression of the battery's remaining energy reserve. Conventional, chargeable batteries, as they were known when the said documents were published, thus had drawbacks especially as regards operating time and reliability, and operations for collecting the batteries for replacement or repair have traditionally been time-consuming and disproportionately expensive.

In connection with the operation of installations on the seabed, it is important that replacement and maintenance of electrically powered equipment which operates such installations can be limited to a minimum, in particular because the equipment is hard to reach, often a long way out to sea and at great ocean depths. Naturally, the same applies also to the replacement and maintenance of equipment that is located at land-based locations that are such that access is awkward and therefore costly.

According to a first aspect of the present invention, the apparatus is specifically related to the power supply of actuators, for example, motors, in a subsea environment, such as the operation or emergency operation of controllable valves in Christmas trees or valves in connection with subsea pipelines. However, the apparatus is also useful for power supply to other types of subsea equipment that do not employ actuators. Such equipment may, for example, be measuring equipment on the seabed, such as seismic equipment, or monitoring equipment which periodically or continuously monitors the operating noise level in a subsea installation.

It has therefore been one of the overall objects of the invention to provide an improved technical solution for power supply to such equipment that is to operate subsea installations, where the focus has especially been directed towards long operating time without maintenance, the capacity for a great number of discharges and charges without a significant reduction in performance or output, high operating reliability, simple monitoring possibilities, and little sensitivity to temperature as regards output or performance.

According to a second aspect of the present invention, the apparatus is especially related to providing a power supply to actuators, for example, motors, in or at hard-to-reach land-based locations, as for example the operation or emergency operation of controllable devices. Such devices may, for example, be valves on water pipelines, petroleum pipelines or gas pipelines located in land-based desolate areas, antennae requiring adjustment, or generally for possible controlled stopping and shielding of equipment when there is a danger of breakdown because of operating faults or weather conditions.

However, the apparatus is also useful for power supply to other types of equipment that do not employ actuators. Such equipment could, for example, be measuring equipment or signalling equipment on mountain tops, warning equipment, or equipment which periodically or continuously monitors the operating noise level in a pipe installation either on the seabed or out in a remotely located installation. Such equipment is not necessarily so power-consuming.

With the present invention it has been found that so-called high-energy capacitor packages may be well suited for power supply of the kind that is required for equipment for the operation of subsea installations and land-based installations.

In recent years, several types of such capacitor packages have been developed which have a number of advantages over chargeable batteries, such as lower weight, longer lifetime, the possibility of more reliable and accurate monitoring of charge status, simpler construction, easier charging (no need for start and stop of charge process), higher reliability, a significantly greater number of possible charges and discharges than an ordinary chargeable battery, and simpler electronics (less sensitive to malfunctions/operating disruptions) for controlling a system in which such a capacitor package is included as power supply.

Traditionally, capacitors have not been viewed as technologically competitive in comparison with conventional batteries. The amount of energy per unit of weight and unit of volume has been far smaller. Despite this, capacitors have had far better properties than batteries as regards frequent charging and discharging, the control thereof and the capacitor lifetime. For these reasons, capacitors have, however, played a different role in areas of application and have been employed primarily in rectifiers and control circuits. Such standard electrolytic capacitors have a normal lifetime in the range of 40,000-60,000 hours.

At the end of the 1990s, research was started on the development of a new type of capacitor which in turn brought the use of capacitors for energy storage into focus. Capacitors of this type were given the name "ultracapacitor". This technology was commercially available on the market in about 2002, and was utilised in the first test installations to supply power to fork-lift trucks, small vehicles and some larger vehicles, including special buses. Accordingly, the power supply was limited to equipment that operated under easily controllable conditions and at normal pressure, i.e., at 1 atm pressure. Roughly estimated, ultracapacitors of this kind have about 10 times more energy storage density than traditional electrolytic capacitors. Typical manufacturers of such capacitor packages are EPCOS and MAXWELL (www.maxwell.com).

A further development of high-energy capacitor packages of this type is believed to be able to provide units with an even greater energy capacity than is possible with today's technology.

Unfortunately, these new capacitor packages are still not competitive in industrial or commercial products, in particular because of their high price and their still large dimensions for large power requirements and thus a substantially greater danger if used incorrectly, for example, a danger of explosion and large short-circuiting currents. This probably has some connection with the fact that the products concerned are typically surface vehicles, as for instance specially equipped buses. In connection with products of this type, it is important that the power supply part is easily accessible. Traditionally, when power supply in the form of chargeable batteries is used for, for example, surface vehicles, it is obvious that battery replacement has to be extremely easy to carry out. Normally, a chargeable battery has a gradually poorer performance over time, and as a rule replacement is carried out as a matter of routine after a certain number of operating hours. Alternatively, other parameters such as acid content, charge current and short circuiting risk are watched for. In any case, replacement takes place well before a critical situation arises.

In subsea applications, unit price will hardly be critical, and even if the volume of the unit in relation to energy capacity might be regarded as a disadvantage, the volume of the unit will generally be compensated for by the technical advantages of this type of power source. Against a background of extremely difficult accessibility and extremely costly processes in connection with replacement, lifetime and reliability are factors which have a greater importance than price and small physical size.

Such a solution involving the use of high-energy capacitor packages for power supply will necessitate the use of suitable electronics for controlling charging and discharging, and for monitoring the energy reserve in the high-energy capacitor package. Such electronics will be substantially simpler and more reliable than an electronics-based system which is to ensure charging, discharging and monitoring of a conventional chargeable battery, especially when the purpose is to carry out the same end functions.

On the use of a power supply to equipment at great ocean depths, where high external pressure is present, there is a risk of the capacitor package collapsing because of the high external pressure. Therefore, in certain embodiments of capacitor packages it may be advantageous to place them in a pressurised container which has internal normal pressure, ideally a pressure of, or close to, 1 atm, so as to prevent the capacitor package from collapsing or being adversely affected by the higher external pressure to such an extent that its properties or performance are significantly altered.

If capacitor packages are to be used at great heights, with a risk of bulging and thus a structural change, it may similarly be relevant to use capacitor packages that are placed directly in a pressurised environment with a nominal pressure, as pressure variations or a large deviation from nominal pressure may have an unfortunate effect on the operating parameters. Nominal pressure here is envisaged to be, for example, about 1 atm.

Such local energy supply units in the form of high-energy capacitor packages will be suitable for use in safety applications or so-called back-up systems, as in some cases they will be capable of replacing, for example, traditionally used battery package solutions in subsea installations or land-based installations, which in many cases may be unfavourably large and heavy. Such capacitor packages also have stable operating characteristics in the temperature range of from $-40°$ C. to $+65°$ C.

The characteristic features of the inventive apparatus and use of a high-energy capacitor package are set forth in the attached claims, and in the description that now follows with reference to the attached drawing figures.

FIG. 6 shows, by way of example, a typical use of the apparatus in a subsea environment.

FIG. 7 shows, by way of example, a typical use of the apparatus in a land-based environment.

Figure 1:
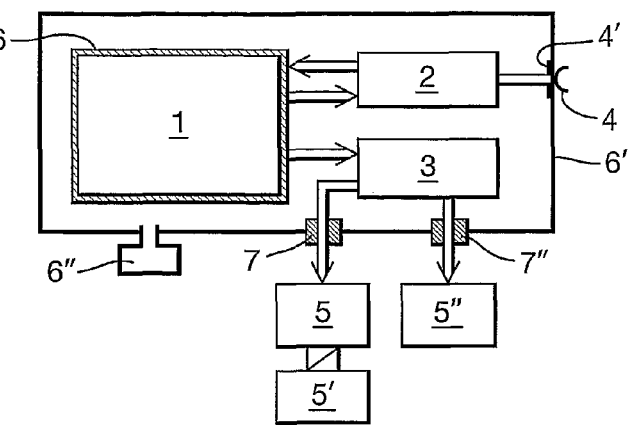
FIG. 1 is a schematic illustration of a typical energy capacitor package with associated electronics, according to the invention.

FIGS. 1-5 show high-energy capacitor package(s) 1 which is/are connected to an electronic control unit 2 intended for monitoring the capacitor package and controlling its charging, and also a control unit 3 which controls the energy supply to an actuator 5, for example, a motor with a gear 5'. Furthermore, energy supply can be provided to other equipment 5" than an actuator. A connector 4, for example, of an inductive type or other suitable type, and preferably fluid-tight and pressure-tight, can provide connection to an external power supply that is used for charging the capacitor package 1 via penetrator 4' and the control unit 2. To prevent damage to the capacitor package, for example, as a consequence of compression or collapse because of the external high pressure at the seabed, or bulging/cracking because of lower pressure at great heights on land, and thus a possible change in the nominal output of the capacitor package, it may be encapsulated in a pressure-tight, sealed container 6. The container preferably has an internal pressure that is substantially smaller than the ambient pressure when used in a subsea installation, or a substantially greater pressure than the ambient pressure in land-based installations at great heights. Advantageously, the internal pressure may be 1 atm.

In what follows "pressure-tight housing" or "container" is used to mean a housing or container whose internal pressure is equal or close to nominal pressure, for example, equal or close to 1 atm. The expression "sealed housing that is connected to a pressure compensator", or the term "pressure-compensated housing" is to be understood to mean that the housing has an internal pressure that is roughly equal to the pressure that surrounds the housing.

Figure 2:
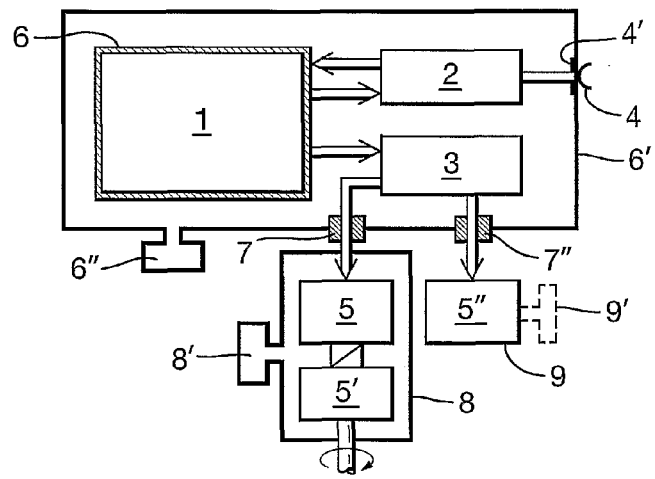
FIG. 2 shows a small modification of the apparatus illustrated in FIG. 1.

In FIGS. 1 and 2 it is shown that the capacitor package 1 with surrounding pressure-tight container 6, together with the control units 2, 3, is mounted inside a sealed housing 6' which is equipped with a pressure compensator 6". In this case, power supply to actuator 5 with optional gear 5' and/or to other equipment 5" is passed out of the housing 6' via penetrators 7, 7'. As shown in FIG. 2, the actuator 5 with gear 5' may optionally be located in a sealed housing 8 which may be provided with a pressure compensator 8', so that internal pressure in the housing 8 is equal to the external pressure. For optional additional equipment 5", a housing 9 with pressure compensator 9' may optionally be provided, or the housing may be preprovided with internal pressure equal to about 1 atm., i.e., that the pressure compensator 9' is omitted.

Figure 3:
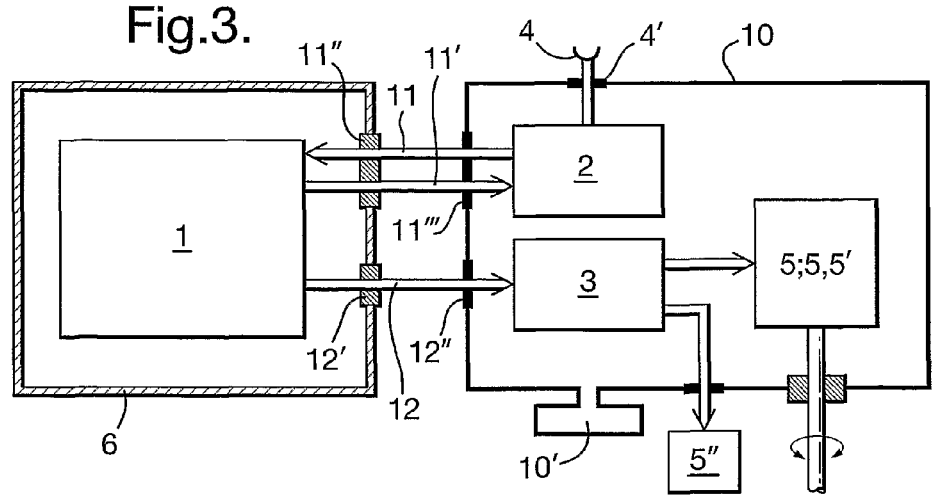
FIG. 3 shows a further modification of the apparatus illustrated in FIGS. 1 and 2.

In FIG. 3 it is shown that the capacitor package is mounted inside a pressure-tight housing 6, whose internal pressure is close to or at nominal pressure, i.e., 1 atm. Such a housing will necessarily have thick walls to be able to withstand high pressures at great ocean depths, or low pressures at great heights. In this figure, the control units 2, 3 are shown in another housing 10 together with the actuator 5 and optional gear 5'. The housing 10 has a pressure compensator 10' which ensures that the pressure inside the housing 10 is the same as the outside pressure. Power supply is provided via coupling 4 and associated penetrator 4'. Power supply and control between the unit 2 and the capacitor package 1 takes place via connections 11, 11' and 12 and via associated penetrators 11", 11''' and 12', 12".

Figure 4:
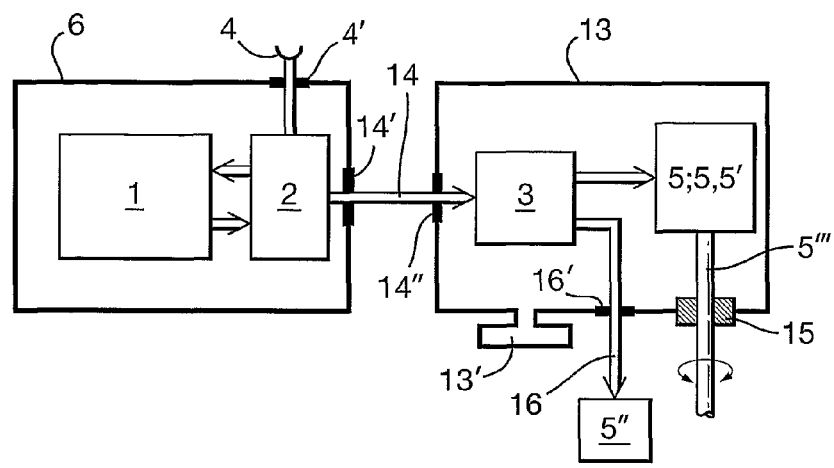
FIG. 4 shows a variant of the embodiment illustrated in FIG. 3.

The embodiment shown in FIG. 4 differs from that shown in FIG. 3 in that the control unit 2 is placed in the same pressure-tight housing 6 as that which surrounds the capacitor package 1. When this solution is used, i.e., with an internal pressure in the housing close to the normal pressure of about 1 atm, there are no special requirements for pressure-tolerant components in the control unit 1. The control unit 3 which supplies the actuator 5 with energy, and also the equipment 5", is expediently placed in a housing 13 which has an associated pressure compensator 13'. Power supply from the unit 2 to the unit 3 takes place via transmission 14 with associated penetrators 14', 14". The drive shaft 5''' from the actuator 5 passes out of the housing via a pressure-tight bushing 15. Similarly, the equipment 5" will receive power supply from the unit 3 via cable 16 and associated penetrator 16'. The equipment 5" may optionally be pressure compensated, as shown in FIG. 2, or placed in a housing whose internal pressure is at nominal pressure of about 1 atm.

The solution shown in FIG. 4 is especially suitable for the cases when it is desirable to have, for example, actuator 5 with associated control unit 3 in the same unit or housing 13, which may mean that the power supply package consisting of the capacitor package 1, the control unit 2 and the external power supply 4, may optionally have several terminals for supplying power to several actuators supplied by the control unit. In this case, as in the cases shown in FIGS. 1-3, the components used in the control unit 3 must be pressure-tolerant, to the same extent as the components in the control unit 2 would have to be for the solution shown in FIGS. 1-3.

Figure 5:
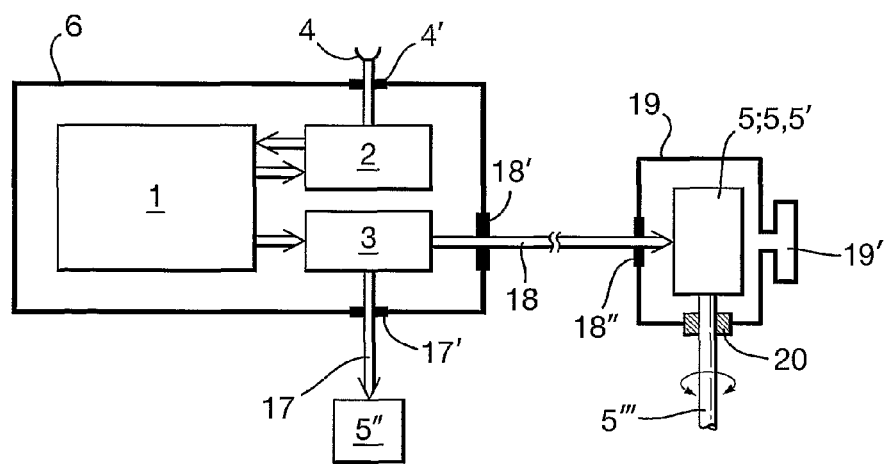
FIG. 5 shows a variant of the embodiment illustrated in FIG. 4.

FIG. 5 shows that both the capacitor package 1 and the two control units 2, 3 are in the same pressure-tight container or housing 6, pressurised to almost nominal pressure of 1 atm. This means that the components used in the control units 2, 3 in this case do not need to be pressure-tolerant. Here, electric power is supplied to the equipment 5" via cable 17 with associated penetrator 17'. Furthermore, the actuator 5 is provided with power via cable 18 and associated penetrators 18', 18" inside a sealed housing 19 which surrounds the actuator 5 with optional associated gear 5', and where there is a pressure compensator 19'. The actuator shaft 5''' is passed out of the housing 19 via a pressure-tight bushing 20.

The chargeable power source 1 should at the outset preferably have an internal pressure that is equal or close to nominal pressure of about 1 atm in order to obtain optimal operation.

It will also be understood that the capacitor package 1 may consist of a link-up of a plurality of smaller capacitor packages by adding the capacitance values.

FIG. 6 shows how the apparatus may conceivably be used in connection with a subsea installation where in connection with, for example, a pipeline 21 there is arranged a controllable valve 22 with valve spindle 22'. The valve spindle may be through-going so that a hydraulic actuator 23 can operate the valve under normal conditions, and that the motor 5 via its gear 5' is arranged to operate the valve only if the hydraulic actuator fails. The hydraulic actuator can in a non-energised condition provide power supply for charging the capacitor package using an internal current generator, or in that an umbilical 24 from the sea surface 25 to the actuator 23 contains a low-level power supply for this purpose. As an alternative or supplement, the capacitor package may have an external power supply for charging through the use of a generator 26; 27 which is based on the use of water currents or wave motions, and where power supplies take place via cable 26'; 27' to connector 4. As an alternative, power supply for charging the capacitor package may be provided from a solar energy panel device 28 fastened to a float 29 with a weight 29', and where cable 28' leads down to the connector 4.

FIG. 7 shows how the apparatus may conceivably be used in connection with an installation where in connection with, for example, a pipeline 30 there is arranged a controllable valve 31 with valve spindle 31'. The motor 5 via its gear 5' is arranged to operate the valve if operating conditions, for example, require that the valve be closed. As an alternative or supplement, the capacitor package 1 may receive external power supply for charging by using one of a wind power generator 32; a solar power panel 33; or a miniturbine generator 34 which may utilise water currents in adjacent rivers or streams where there is a certain minimum flow of water, and where power supply takes place via cable 32'; 33'; 34' to the connector 4.

It is conceivable that such equipment could be remote-controlled or communicate by signals via satellite communication, a mobile telephone network or the like. Here, a communication unit 35 is shown which is connected to antenna equipment 36 and connected to the control units 2, 3 and also connected to a connection 37' to, for example, a noise sensor 37 located on the valve 8.

Figure 8:
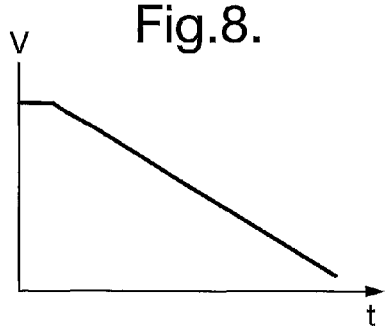
FIGS. 8 and 9 shows, by way of example, power control of equipment that employs the apparatus.
Figure 9:
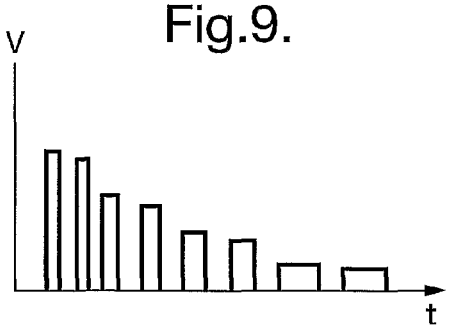

FIG. 8 shows a typical voltage curve for a capacitor package during discharge and FIG. 9 shows how the residual energy present could be used, in that the power that is delivered to the actuator 5 is pulsed, and where the power in each pulse is constantly approximately the same. This means that when the output voltage from the capacitor package gradually drops as a consequence of discharge, the duration of the pulse will gradually increase.

In a given situation where, for example, it is desired to open or close a valve 22; 31, the actuator 5 will normally only need to operate within a limited period of time, for example, less than one minute. If stored energy is, for example, 10 watt-hours, this means that the motor ideally has available about 600 watts of power for about 1 minute. Under given conditions, such an amount of energy will be more than enough before the capacitor package has to be charged.

The invention claimed is:

1. An apparatus for power supply to electronic, electrical or electromechanical equipment, the apparatus comprising:
    a chargeable power source;
    a power source control unit for monitoring and controlled charging of the power source;
    a means for power supply from an external energy source to the power supply control unit; and
    an equipment control unit for controlling power supply from the power source to the equipment,
    wherein the chargeable power source consists of at least one high-energy capacitor package;
    the chargeable power source is placed in a pressure-tight container that is distinct from the chargeable power source, and which has an internal pressure that differs from the ambient pressure; and
    the pressure in the container is about 1 atm.

2. An apparatus according to claim 1, wherein the equipment control unit is configured to receive energy supply only from the chargeable power source, irrespective of whether external power supply for charging of the power source is available or not.

3. An apparatus according to claim 1, wherein placement of the power source in a pressure-tight container is chosen from the group of:
    placement in a pressure-compensated housing which in addition holds the equipment control unit and the power source control unit,
    placement at a distance from a housing which holds the equipment control unit and the power source control unit,
    placement in the of both the power source and power source control unit in the same pressure-tight container, the equipment control unit and said equipment being mounted in a common pressure-compensated housing, and
    placement of the power source, the equipment control unit and the power source control unit in the same pressure-tight container, said equipment being placed externally in relation to the container.

4. An apparatus according to claim 1, 2 or 3, wherein the equipment comprises an actuator for controlling a functional means.

5. An apparatus according to claim 4, wherein the actuator is an electric motor.

6. An apparatus according to claim 1, wherein said means for external power supply further comprises a power transmission connector connectable between an external power source and the power source control unit, said connector selectable from the group of: contactless type, inductive type and water-tight connector type.

7. An apparatus according to claim 1 or 6, wherein the external energy source is at least one of: a wind power generator, a solar energy panel, a water-driven mini-turbine generator and a wave power generator.

8. Usage of an apparatus according to claim 1, 2, or 3 in a sub-sea environment for power supply to an actuator arranged to operate controllable sub-sea installation equipment.

9. Usage according to claim 8, wherein the equipment is an actuator that is arranged to operate a valve in a fluid-transporting piping system.

10. Usage according to claim 8, wherein the sub-sea installation equipment is a valve and the actuator is a motor which via a gear is arranged to manipulate a valve spindle on the valve.

11. Usage of an apparatus according to claim 1, 2, or 3 at an installation in a hard-to-reach land-based environment or terrain for power supply to electronic, electrical or electromechanical equipment thereat.

12. Usage according to claim 11, wherein the equipment is an actuator that is arranged to operate a valve in a fluid-transporting piping system.

13. An apparatus according to claim 1, 2 or 3, wherein the equipment control unit is arranged to output energy from the power source to the equipment in the form of a pulse train, where the energy in each output pulse is approximately the same.

* * * * *